United States Patent [19]
Handke et al.

[11] Patent Number: 5,462,142
[45] Date of Patent: Oct. 31, 1995

[54] FLUID OPERATED DAMPER WITH NONRELEASABLE COVER UNIT FOR ELECTROMAGNETIC VALUE

[75] Inventors: Günther Handke, Euerbach; Alfred Wirth, Schweinfurt; Andreas Zietsch, Röthlein, all of Germany

[73] Assignee: Fichtel & Sachs AG, Schweinfurt, Germany

[21] Appl. No.: 91,664

[22] Filed: Jul. 14, 1993

[30] Foreign Application Priority Data

Jul. 15, 1992 [DE] Germany .................. 9209505.4 U

[51] Int. Cl.6 ............................. F16F 9/46; B60G 17/08
[52] U.S. Cl. .................. 188/299; 188/322.12; 220/725; 403/202; 403/365
[58] Field of Search ..................... 188/315, 299, 188/322.12, 322.19, 322.13; 138/96 R; 220/724, 725, 86.4; 403/202, 365; 280/707, 714

[56] References Cited

U.S. PATENT DOCUMENTS

| 5,163,706 | 11/1992 | Maguran, Jr. et al. | 188/299 X |
| 5,301,412 | 4/1994 | Hahn et al. | 188/299 X |

FOREIGN PATENT DOCUMENTS

| 0356937 | 3/1990 | European Pat. Off. . |
| 0510741 | 10/1992 | European Pat. Off. . |
| 4024920 | 2/1992 | Germany . |
| 2247933 | 3/1992 | United Kingdom . |

Primary Examiner—Josie A. Ballato
Attorney, Agent, or Firm—Nils H. Ljungman & Associates

[57] ABSTRACT

A fluid oscillation damper is provided with an electromagnetically controlled valve for varying the damping force of the oscillation damper. The electromagnetically controlled valve is housed within a compartment confined by two housing parts. A first housing part is fastened to a container of the oscillation damper. A second housing part is fastened to the first housing part. Both housing parts are nonreleasably interconnected.

34 Claims, 5 Drawing Sheets

FLUID OPERATED DAMPER WITH NONRELEASABLE COVER UNIT FOR ELECTROMAGNETIC VALUE

BACKGROUND OF THE INVENTION

In modern motor cars hydraulic oscillation dampers are provided which permit variation of the damping behaviour. Such hydraulic oscillation dampers are provided with an electromagnetically controlled valve unit. This valve unit is provided in a flow path connecting two working chambers the volume of which is altered in opposite senses during movement of a piston rod with respect to the container of the respective oscillation damper. This flow path is in parallel with a continuously open throttled flow path. By variation of the cross-sectional area of the flow path through the electromagnetically controlled valve unit, the damping behaviour of the oscillation damper can be varied. The variation of the damping behaviour may be a continuous or a step-wise variation. The electromagnetically controlled valve unit is preferably fastened to the outer side of a container of the oscillation damper. Electromagnetic and fluidic components of the valve unit are accommodated within a compartment attached to the outer side of the container.

STATEMENT OF THE PRIOR ART

According to German patent publication DE-OS 40 24 920 a tubular basic housing unit is mounted to the external side of the container of an oscillation damper. A cover unit is fastened to the free end of the basic housing unit. For the connection of the cover unit an interconnecting sleeve is used. This interconnecting sleeve is axially movable along the tubular basic housing unit against an abutment ring fixed in a circumferential groove of the tubular basic housing unit. The interconnecting sleeve is provided with internal thread means which can be screwed onto external thread means of the cover unit until the interconnecting sleeve abuts the abutment ring. Such, the cover unit may be pressed into sealing engagement with the basic housing unit.

It is to be noted that the German publication DE-OS 40 24 920 is commonly owned with the present application.

The above-mentioned older construction has two drawbacks:

On the one hand, the interconnecting sleeve can be released by any hobbyist, and it cannot be expected that the necessary torque is applied when reassembling the cover unit and the basic housing unit by screwing the interconnecting sleeve with respect to the cover unit. Such, the expected tightness cannot be guaranteed after reassembling. Inadequate tightness may lead to a reduction in damping power owing to the loss of the damping medium within the valve unit.

A further drawback comes up, when pressurized gas is contained within the oscillation damper. In this case, the gas pressure may be reduced when dissembling the cover unit and the housing unit. A reduction of the gas pressure leads to the risk of foaming of a liquid within the oscillation damper during operation. For the hobbyist or other unauthorized person it is scarcely possibly to establish gas pressure again within the oscillation damper after reassembling the cover unit and the basic housing unit.

A further disadvantage may occur with the above-mentioned construction, when by the connection of the cover unit and the basic housing unit a ferromagnetic flange portion is located inside the compartment confined by the basic housing unit and the cover unit. In such a construction the loosening of the connection between the basic housing unit and the cover unit and the reassembling of these units after a preceding disassembling can lead to a wrong positioning of components within the compartment. E. g. the abutment faces for biasing springs may be wrongly located so that the respective biasing forces are wrongly adjusted and the damping power is different from the expected damping power. So it may occur that the expected hardest damping characteristic cannot be selected.

OBJECT OF THE INVENTION

It is an object of the present invention to provide an electromagnetically controlled valve unit for a fluid operated oscillation damper, in which the safety level is increased by making a disassembly of the housing units confining the electro-magnetic and fluidic components impossible or at least very difficult so that misadjustment of the housing units and of the electromagnetic and fluidic components contained therein is avoided.

A further object is to obtain a simplified design and to allow simple assembling methods.

A further object of the invention is to warrant the tightness of the compartment confining the electromagnetic and fluidic components.

A further object is to prevent hobbyists, amateurs and other unauthorized people from access to the electromagnetic and fluidic components inside the compartment, such as to prevent unauthorized modification of the damping characteristics of the oscillation damper.

SUMMARY OF THE INVENTION

In consideration of at least a part of the above-mentioned objects the invention provides a fluid operated oscillation damper with an electromagnetically controlled valve unit for varying the damping force of the oscillation damper. The valve unit comprises a plurality of fluidic and electromagnetic valve unit components. At least a part of these fluidic and electromagnetic valve unit components are accommodated within a valve unit compartment of the oscillation damper. The valve unit compartment is confined by compartment confining means. These compartment confining means comprise at least two housing units. One of the housing units is a basic housing unit attached to a part of the oscillation damper. A further one of the housing units is a cover unit attached to the basic housing unit. The cover unit is nonreleasably connected by nonreleasable connection means to the basic housing unit.

By the term "fluid operated oscillation damper" hydraulic, pneumatic and hydropneumatic oscillation dampers are included. Preferably, the damping force is generated by a hydraulic medium flowing through throttled passages. Correspondingly, the term "fluidic valve unit components" is to comprise all valve components which control flow of hydraulic or pneumatic medium.

By the nonreleasable connection of the housing units a nonauthorized person is prevented to disassemble the housing units and the electromagnetic and fluidic valve unit components accommodated therein. Moreover, the sealing measures provided by the manufacturer cannot be damaged by unauthorized persons. Moreover, a damping power adjustment can no longer be manipulated by unauthorized persons.

The cover unit may be connected to the basic housing unit by positively interengaging locking means. These positively interengaging locking means can be obtained by plastic deformation of the respective materials of the housing unit at the location of engagement. These materials may comprise combinations of metal-metal, plastics material-plastics material or metal-plastics material.

According to a first embodiment the basic housing unit and the cover unit have respective sleeve-shaped portions overlapping each other in an axial direction along a common axis. These sleeve-shaped portions are connected with each other. One of these sleeve-shaped portions is a radially inner sleeve-shaped portion, and the other one of these sleeve-shaped portions is a radially outer sleeve-shaped portion.

In case of such an arrangement of a radially inner sleeve-shaped portion and a radially outer sleeve-shaped portion the radially inner sleeve-shaped portion may be provided with a circumferential groove within a radially outer surface thereof, and the radially outer sleeve-shaped portion may be provided with a radially inward displaced circumferential bead engaged into said circumferential groove. The circumferential groove may be preshaped before combining the sleeve-shaped portions such that the material of the radially outer sleeve-shaped portion may then be dislocated radially inwards into the preshaped groove such as to form the circumferential bead. Alternatively, it is also possible to preassemble the sleeves before shaping the circumferential groove and to thereafter provide the circumferential groove simultaneously with shaping the circumferential bead. When talking of a circumferential groove, this term should include a continuous circumferential groove as well as a circular series of individual depressions. Moreover, the term "circumferential bead" should also cover both a continuous bead and a circular arrangement of individual, radially inwardly directed projections obtained by deformation of the radially outer sleeve at the respective locations.

It is also possible that the radially inner sleeve-shaped portion is provided with radially outward directed locking flange means and that the radially outer sleeve-shaped portion is provided with radially inward directed locking flange means bent behind the radially outward directed locking flange means. At least one of the radially outward directed locking flange means and the radially inward directed locking flange means may be circumferentially continuous locking flange means. Alternatively, one or both flange means may be provided by respective series of flange forming sections separated from each other in circumferential direction by respective gaps.

It is further possible that the radially inner sleeve-shaped portion and the radially outer sleeve-shaped portion are locked to each other by a locking ring located radially between a radially outer circumferential face of the radially inner sleeve-shaped portion and a radially inner circumferential face of the radially outer sleeve-shaped portion. The locking ring may be embossed into both the radially inner and the radially outer circumferential face. During the connecting phase one may position the locking ring between a smooth radially outer circumferential face and a smooth radially inner circumferential face and exert radial pressure onto the radially outer sleeve portion such as to simultaneously emboss the locking ring into both adjacent circumferential faces. Alternatively, it is also possible to preshape a groove in the radially outer face, to insert the locking ring therein, to assemble the radially inner and the radially outer sleeve portion with the locking ring being located between the respective radially outer and radially inner circumferential faces and to thereafter urge the material of the radially outer sleeve portion towards the radially inner sleeve portion on both axial sides of the locking ring.

Preferably, the radially inner sleeve-shaped portion is a part of the basic housing unit, while the radially outer sleeve-shaped portion is a part of the cover unit. This is due to the fact that normally the materially of the basic housing unit is a relatively thick metallic tube material which can easily resist the pressure for obtaining the connection.

According to a still further embodiment the basic housing unit and the cover unit have respective radially outer circumferential faces circumferentially extending about a substantially common axis and axially adjacent each other and both said circumferential faces of the basic housing unit and of the cover unit are axially overlapped by an interconnecting sleeve. This interconnecting sleeve is in locking engagement with both circumferential faces of the basic housing unit and the cover unit, respectively. In such case, the interconnecting sleeve may be locked to at least one of the radially outer circumferential faces by a ring member effecting a locking engagement in at least one axial direction. Locking engagement "in at least one axial direction" means that the interconnecting sleeve is movable with respect to said one circumferential face in axial direction unit1 abutting a respective abutment face provided on said on circumferential face.

Further, the interconnecting sleeve may be locked to at least one of the radially outer circumferential faces by a circumferential radially inward directed locking bead engaging into a circumferential locking groove provided in said radially outer circumferential surface.

Preferably, one may combine the two alternatives such that the interconnecting sleeve is shaped for entering into the abutting engagement with abutment means of a first one of the circumferential faces when being brought in overlapping condition with respect to the other one of the radially outer circumferential faces during an assembling phase and that hereupon, the locking bead is generated on the interconnecting sleeve such as to enter into the locking groove. The above-mentioned alternatives for providing the locking groove (preshaping or simultaneous shaping with the shaping of the locking bead) may again be applied. Both the locking groove and the locking bead may again be continuous or constituted by individual depressions and projections, respectively, in circular arrangement.

Sealing means may be provided between the basic housing unit and the cover unit. These sealing means may be maintained under sealing pressure by the nonreleasable connection means.

The basic housing unit may have a tubular shape and may be fastened by one of its ends to a container tube member of the oscillation damper. The other end of the tubular basic housing unit may then be connected to the cover unit. The tubular basic housing unit may e. g. be fastened to the outer circumferential face of the container tube member by welding, such as to have its axis intersecting the axis of the container tube member with a substantially 90° angle. Preferably, the basic housing unit is connected to the container tube member before being assembled with and connected to the cover unit. After connecting the basic housing unit to the container tube member the cover unit is connected thereto. The electromagnetic and fluidic components as defined above may be inserted into the basic housing unit or/and into the cover unit before assembling the cover unit and the basic housing unit.

The cover unit may be partially made of metallic material or ferromagnetic material and partially made of plastics material. The nonreleasable connecting means are preferably provided between the basic housing unit and metallic material of the cover unit. The cover unit may be obtained by a injection moulding process in which the preshaped metallic material is inserted into an injection mould during the injection phase.

If the basic housing unit and the cover unit have a common axis, one may accommodate within the cover unit an annular electromagnetic coil around the axis and an axially movable armature member inside a central space surrounded by the annular electromagnetic coil.

For providing a strong magnetic field acting onto the armature and concentrating the field in the area of the armature with the field lines being directed in axial direction at the location of the armature, one may provide ferromagnetic core means toroidally extending around the annular electromagnetic coil. These ferromagnetic core means may comprise a ferromagnetic flange portion provided axially between the annular electromagnetic coil and the basic housing unit. This ferromagnetic flange portion may be an iron-made flange portion. The electromagnetic flange portion represents a relatively rigid structural part which may also be used for stiffening at least one of the basic housing unit and the cover unit in radial direction. This is particularly true, if the ferromagnetic flange portion fully fills the respective internal cross-sectional area of the basic housing unit or/and the cover unit. It is, therefore, most desirable that the nonreleasable connecting means or at least part of them are provided at or axially adjacent the ferromagnetic flange portion. Thus, reshaping operations by radial pressure onto the radially outer side of the cover unit or/and the basic housing unit may be made in areas stiffened by the ferromagnetic flange portion, and undesirable deformations of the cover unit or/and the basic housing unit are avoided.

The ferromagnetic core means may further comprise a ferromagnetic jacket surrounding the annular electromagnetic coil and integral with a ferromagnetic end wall adjacent an end face of the annular electromagnetic coil remote from the ferromagnetic flange portion. This ferromagnetic jacket may provide a portion of the cover unit nonreleasably connected to the basic housing unit.

Preferably, the ferromagnetic end wall has a central opening axially aligned with the central space of the annular coil. Then, a central ferromagnetic core member may be located inside the central opening and extend into the central space. The central opening may be closed by a plastics material layer of the cover unit. This plastics material layer may cover the ferromagnetic end wall and part of the ferromagnetic jacket.

The plastics material layer of the cover unit may extend through openings of the ferromagnetic jacket and be integral with a plastics material jacket surrounding the annular electromagnetic coil on a radially outer circumferential side thereof. In case of injection moulding the ferromagnetic jacket and the electromagnetic coil are inserted into the injection mould, possibly in combination with further internal components.

The ferromagnetic flange portion may be in axial engagement with a substantially axially directed engagement face of the ferromagnetic jacket. Thus, a correct relative positioning of the ferromagnetic flange portion and the ferromagnetic jacket is obtained and simultaneously, the subassembly comprising the ferromagnetic flange portion and the ferromagnetic jacket may be radially or/and axially positioned with respect to one of the basic housing unit and the cover unit. Moreover, the cover unit may be correctly positioned with respect to the basic housing unit through the ferromagnetic flange portion or/and the ferromagnetic jacket.

The ferromagnetic flange portion may be maintained in axial engagement with the engagement face by the nonreleasable connecting means. Such, the magnetic circuit is positively closed at the interface between the ferromagnetic flange portion and the ferromagnetic jacket.

The ferromagnetic flange portion may further be axially supported by a valve components housing which as again axially supported by and inside the basic housing unit and open towards the central space such as to expose the valve components inside the valve components housing to the armature member.

Sealing means may be provided for sealing the valve components housing with respect to the ferromagnetic flange portion and the basic housing unit. These sealing means may be maintained under sealing pressure by the non-releasable connection means.

The plastics material jacket may form together with a radially outward open coil carrier a coil housing for the annular electromagnetic coil.

The cover unit may be provided with pretension application means permitting pretensioning of the cover unit towards the basic housing unit before and during connecting the cover unit to the basic housing unit. Such, a pretensioning device may be applied to the cover member, on the one hand, and to the oscillation damper, on the other hand, for pretensioning the cover unit and the basic housing unit toward each other.

Moreover, the basic housing unit may be combined with further pretension application means. In this case, the pretension may be applied to the basic housing unit and to the cover unit without loading the container member of the oscillation damper by pretensioning forces.

Both the cover unit and the interconnecting sleeve may be provided with pretension application means permitting pretensioning of the cover unit towards the basic housing unit after having locked said interconnecting sleeve to the radially outer face of the basic housing unit and before locking it to the radially outer surface of the cover unit. This is a preferred embodiment because no reshaping forces act onto the basic housing unit when making the nonreleasable connection.

The invention further concerns a method for assembling a fluid operated oscillation damper with an electromagnetically controlled valve unit of the above described type.

This method comprises fastening the basic housing unit to a part of the oscillation damper, inserting the electromagnetic and fluidic valve unit components into at least one of the basic housing unit and the cover unit, pretensioning the cover unit towards the basic housing unit and nonreleasably connecting the cover unit to the basic housing unit while maintaining pretension between them. The radial deformation of the respective housing portions for providing the connection means may be obtained by conventional rolling or caulking.

The fluid pressure forces occurring within the compartment may be positively transmitted to the basic housing unit. E. g., fluid pressure forces may be transmitted to the ferromagnetic flange portion, from the ferromagnetic flange portion to the cover unit and from the cover unit to the basic housing unit through the connection means. The connection means are such that they can be easily obtained in the manufacturing plants. They cannot be opened and reclosed by an unauthorized person. In case of need of repair the manufacturer or other authorized persons can, nevertheless, easily release the connection means and apply them again after repair such that no damaging of the internal electromagnetic and fluidic components is to be expected, more particularly, damaging to the magnetic coil, the casing thereof and the armature is avoided.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereinafter with reference to the embodiments shown in the accompanying drawings in which

FIG. 2 shows a cross-sectional view through a valve unit attached to a container pipe 23 through a valve unit attached to a container pipe of the vibration damper, wherein the cross-sectional view contains an axis of the valve unit, which axis is orthogonal with respect to the axis of the vibration damper, and wherein FIG. 2 shows a first embodiment of nonreleasable connection means between a basic housing and a cover unit;

DETAILED DESCRIPTION OF THE PREFERRED EMBODIMENTS

Figure 1:
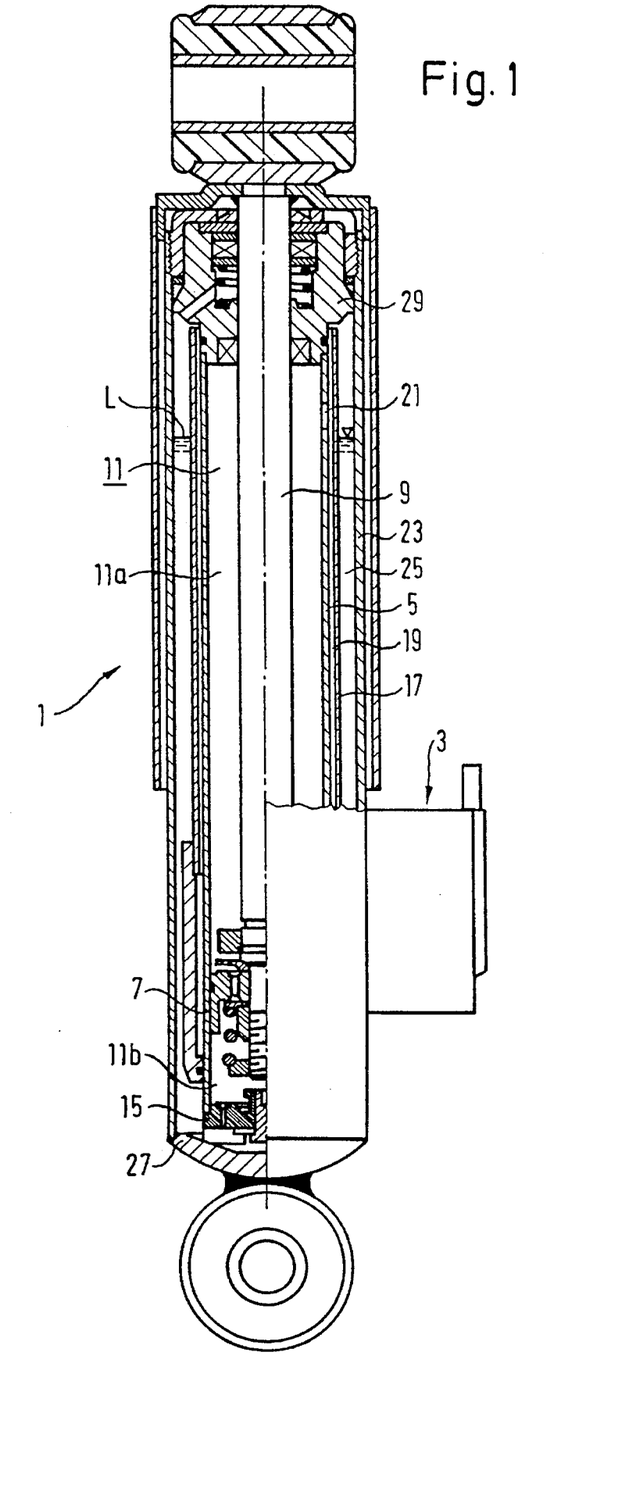
FIG. 1 shows an overall view of an oscillation damper or vibration damper of a motor vehicle with a variable damping power.

FIG. 1 shows a complete oscillation damper 1, a detailed illustration of the valve unit 3 being omitted for the sake of clarity. The oscillation damper 1 consists essentially of a pressure pipe 5 in which a piston 7 on a piston rod 9 divides a working space 11 into an upper or piston-rod-side working chamber 11a and a lower or piston-rod-remote working chamber 11b. A bottom valve unit 15 closes the pressure pipe 5 at the lower end thereof. A fluid path 19 is formed between the pressure pipe 5 and an intermediate pipe 17, said intermediate pipe 17 being arranged concentrically with respect to the pressure pipe 5. A connecting orifice 21 in the pressure pipe 5 connects the upper working chamber 11a with the fluid path 19. A compensating chamber 25 is confined between the intermediate pipe 17 and a portion of the pressure pipe 5, on the one hand, and a container pipe 23, on the other hand. This compensating chamber 25 is axially limited by a base member 27 and a piston rod guiding and sealing unit 29. The working space 11 is separated by the piston 7 into the upper working chamber 11a and the lower working chamber 11b. Both the upper and the lower working chamber are filled with a liquid. The compensating chamber 25 is also filled with damping liquid up to the level L and contains a possibly pressurized gas above the level L. The bottom valve unit 15 provides communication between the working chamber 11b and the compensating chamber 25.

The piston 7 provides communication between the lower working chamber 11b and the upper working chamber 11a. According to an illustrative example the oscillation damper works as follows: When the piston rod 9 moves upwards, a high flow resistance occurs across the piston 7 and a high pressure is generated in the upper working chamber 11a. Liquid from the upper working chamber 11a flows through said high flow resistance into the lower working chamber 11b. As the piston rod 9 moves outward of the working space 11, the available volume within the working space 11 is increased. Therefore, liquid can flow from the compensating chamber 25 through the bottom valve unit 15 into the lower working chamber 11b. The flow resistance through the bottom valve unit 15 is small in this phase of operation. The movement of the piston rod 9 with respect to the pressure pipe 5 is damped.

On inward movement of the piston rod 9 fluid flows from the lower working chamber 11b through the piston 7 into the upper working chamber 11a. The flow resistance across the piston 7 is relatively small and the flow resistance across the bottom valve unit 15 is relatively large. Therefore, a considerable pressure exists even within the upper working chamber 11a. The volume within the working space 11 is reduced by the piston rod 9 entering into the working space 11. Thus, damping liquid must flow from the lower working chamber 11b through the bottom valve unit 15 into the compensating chamber 25. In this phase of operation the flow resistance through the bottom valve unit 15 is high such that a high pressure occurs within the lower working chamber 11b and also within the upper working chamber 11a.

By the connecting orifice 21 and the fluid path 19 the upper working chamber 11a is connected with the compensating chamber 25 via the valve unit 3. This is shown in more detail in FIG. 2, which will be described later. As long as the valve unit 3 is closed, the bypass established by the connecting orifice 21, the fluid path 19 and the valve unit 3 is also closed. This is the hardest mode of operation of the oscillation damper. When, however, the valve unit 3 is more or less opened, the bypass is also open. As a result thereof the following behaviour exists: On upward movement of the piston rod 9 liquid can flow from the highly pressurized upper working chamber 11a not only across the piston 7 providing a high flow resistance but also from the working chamber 11a through the bypass 21,19,3 to the compensating chamber 25. Such, the damping force is reduced.

When the piston rod 9 moves downwards, there exists again a high pressure within the upper working chamber 11a, as described above. Therefore, damping liquid can flow from the upper working chamber 11a through the bypass 21,19,3 to the compensating chamber 25. This means that the damping liquid which must be expelled from the working space 11 as a result of the reduced volume therein does not only escape through the bottom valve unit 15 to the compensating chamber 25 but can also partially escape through the bypass 21,19,3 to the compensating chamber 25. Such, the damping force is again reduced by the open bypass 21,19,3. It is to be noted that the direction of flow of the damping liquid through the bypass 21,19,3 is the same, both on upward movement and downward movement of the piston rod 9 with respect to the pressure pipe 5. By increasingly closing the flow resistance through the valve unit 3 the damping force can be increased both for upward and downward movement of the piston rod 9, and by increasingly opening the valve unit 3 the damping force can be reduced both for upward movement and downward movement of the piston rod 9. It is possible to selectively open and close the valve unit or to continuously vary the flow resistance through the valve unit 3.

Figure 2:
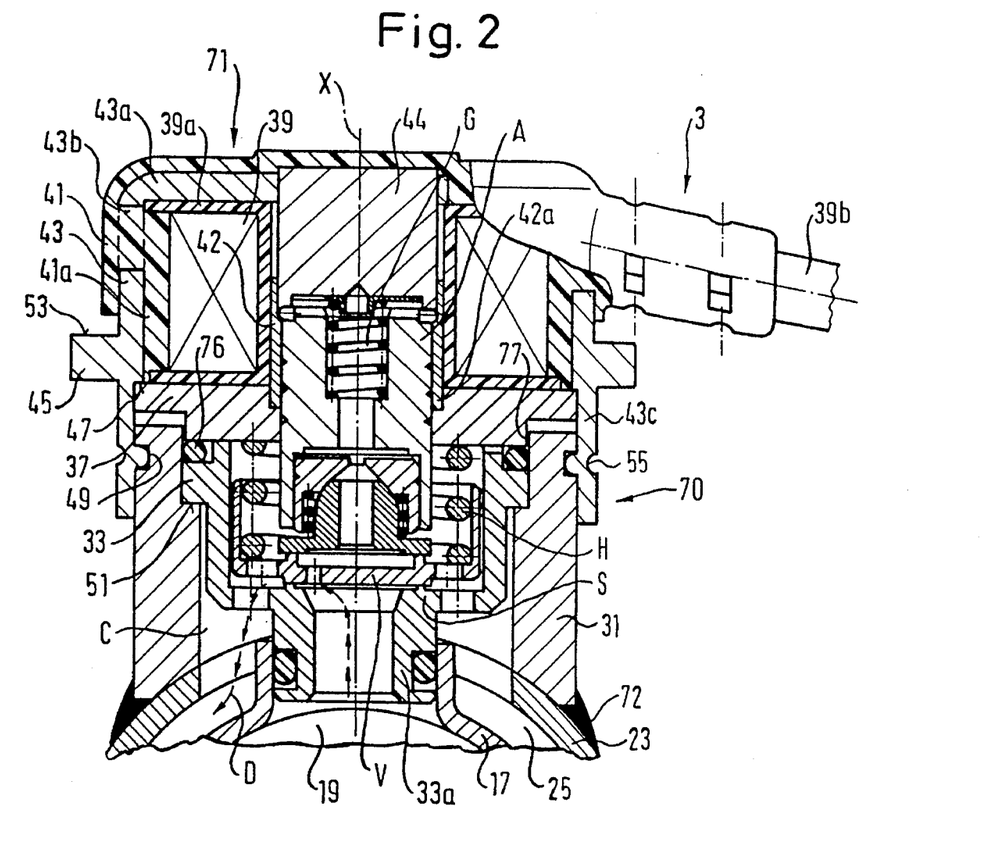

In FIG. 2 one can again see the fluid path 19 and the compensating chamber 25, which are interconnectable through the valve unit 3 with cable 39b. The fluid path 19 is connected to the upper working chamber 11a as shown in FIG. 1. The flow direction from the fluid path 19 to the compensating chamber 25 across the valve unit 3 is indicated in FIG. 2 by the dotted line D provided with arrows indicating the flow direction both for inward movement and outward movement of the piston rod 9 with respect to the pressure pipe 5. One can see in FIG. 2 a valve member V which can be lifted with respect to a valve seat S, such as to open the flow path D from the fluid path 19 to the compensating chamber 25 For more details as to the function of the valve unit 3 it is referred to the above-mentioned German publication DE-OS 40 24 920A1 published on 13 Feb. 1992, to the corresponding U.S. patent application 07/738 155 filed on 30 Jul. 1991, from which the following U.S. patent applications were continuations: Ser. No. 08/071,994 now abandoned; Ser. No. 08/157,837now abandoned; and Ser. No. 08/238,806.

Reference is also made to the corresponding British Publication GB 22 47 933A published on 18 March 1992. For explaining the principles of the present invention it is sufficient to say that the valve member V is urged downward in the closing sense towards the valve seat S by a helical compression spring H and that the valve member V can be lifted in response to upward movement of an electromagnetic armature member A. This armature member A is biased in downward direction by a helical compression spring G and can be lifted by energization of a magnetic coil 39 which is energized through a current supply cable 39b. Further details of the construction and operation can be taken from the above-mentioned specifications.

The valve unit 3 comprises a housing 70. This housing 70 is composed by a basic housing tube 31 and a cover unit 71. The basic housing tube 31 is welded at 72 to the container pipe 23. The cover unit 71 is fastened to the basic housing tube 31.

A pot-shaped valve components housing 33 is inserted into the basic housing tube 31 and is axially located on a shoulder face 51 inside the basic housing tube 31. Various valve components are located inside the valve components housing 33. The lower end of the valve components housing 33 is shaped as a tube section 33a, which provides the valve seat S and is sealingly connected to the fluid path 19.

The cover unit 71 comprises an iron jacket 43 integral with an iron end wall 43a. The iron jacket 43 and the iron end wall 43a are coated with a plastic layer 41. An annular electromagnetic coil 39 is housed within the iron jacket 43. This electromagnetic coil 39 is carried by a coil carrier 39a, which is annular about an axis X and is open in radial outward direction. The coil carrier 39a is closed in radially outward direction by a plastics material 41a integral with the plastic layer 41 through openings 43b of the iron jacket The plastics layer 41 and the plastics material 41a are integrally moulded by injection moulding with the iron jacket 43, the iron end wall 43a integral therewith and the electromagnetic coil 39 and the coil carrier 39a being inserted into the injection mould.

A ferromagnetic core 44 is inserted into a central opening of the iron end wall 43a and covered by the plastics layer 41. An iron flange portion 37 is provided at the lower side of the electromagnetic coil 39 and is engaged with a shoulder face 47 of the iron jacket 43. A pole tube 42 is seated within an annular recess 42a of the iron flange portion 37. The pole tube 42 is sealingly connected to the iron flange portion 37 and to the ferromagnetic core 44. The armature A is guided within the pole tube 42. The pole tube 42 is made of nonmagnetic material so that the magnetic field lines are deflected by the lower end of the pole tube 42. The iron jacket 43, the iron end wall 43a, the ferromagnetic core 44 and the iron flance portion 37 form a ferromagnetic core arrangement which toroidally surrounds the electromagnetic coil 39.

The cover unit 71 is fastened to the basic housing tube 31 by a sleeve-shaped extension 43c of the iron jacket This sleeve-shaped extension 43c axially overlaps the basic housing tube 31. The sleeve-shaped extension 43c is fastened to the basic housing tube 31 by a circumferential bead 55 being embossed into a circumferential groove 49 on the radially outer face of the basic housing tube 31. The iron jacket 43 is provided with a pretensioning flange 45. The pretensioning flance 45 offers a pretension face 53. The cover unit 71 can be pretensioned in downward direction as shown in FIG. 2 toward the basic housing tube 31 by a pretensioning tool engaging the container pipe 23, on the one hand, and the pretensioning face 53, on the other hand. Such, the iron flange portion 37 is pressed against the upper end of the valve components housing 33, the valve components housing 33 is engaged with the shoulder face 51 of the basic housing tube 31, and the iron flange portion 37 is engaged with the shoulder face 47 of the iron jacket 43. The helical compression spring H is compressed between the iron flange portion 37 and the valve member V, which is seated on the valve seat S.

While maintaining this pretension of the cover unit 71 against the basic housing tube 31, the bead 55 is rolled or caulked into the circumferential groove of the basic housing tube 31 so that after removing the pretensioning tool an internal pretension is maintained. A sealing ring 76 is, therefore, maintained in sealing engagement with the valve components housing 33, the iron flange portion 37 and the basic housing tube 31. Such, the compartment C confined by the basic housing tube 31 and the cover unit 71 is sealed against atmosphere. All components of the valve unit 3 are positioned with respect to each other, and the helical compression spring H as well as the helical compression spring G and further springs are biased to the desired degree.

It is to be noted that the upper end of the basic housing tube 31 is radially engaged at 77 with the iron flange portion 37 such that when rolling or caulking the bead 55 into the groove 49, no deformation of the basic housing tube 31 and of the iron jacket 43 can occur.

Figure 3:
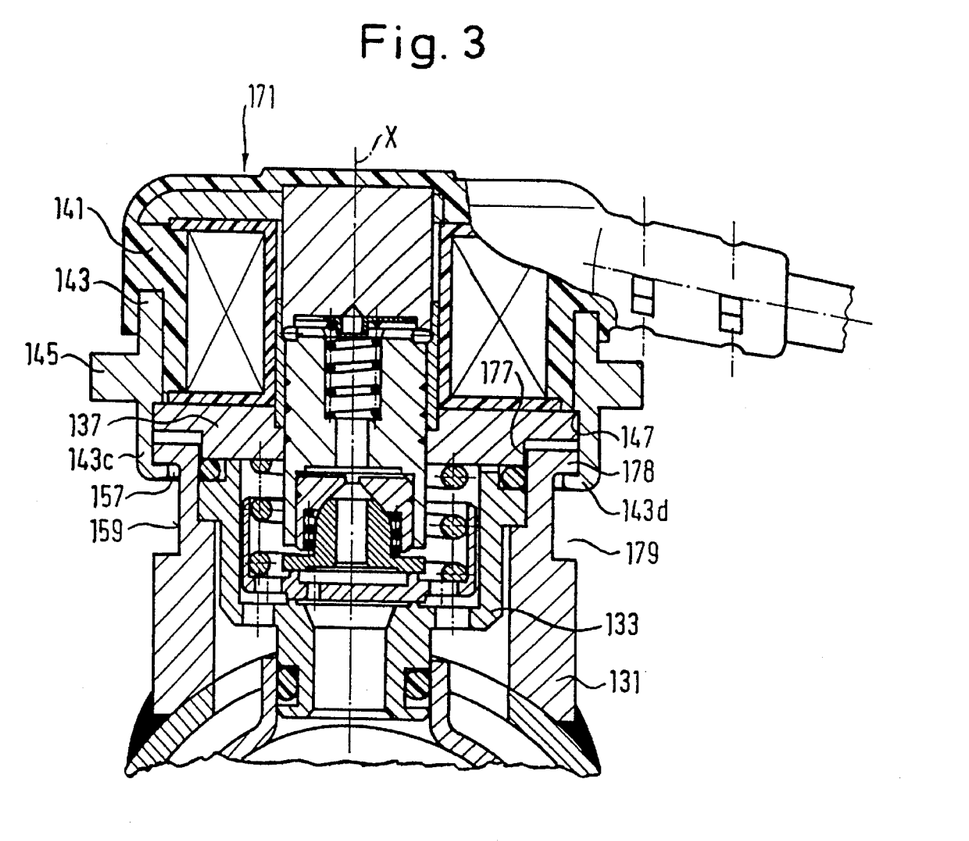
FIG. 3 shows a cross-sectional view as in FIG. 2, with a second embodiment of nonreleasable connection means.

The electromagnetic coil 39 is completely separated from the liquid within the compartment C by the iron flange portion 37. The pretension during connecting the cover unit 71 and the basic housing tube 32 is selected such that no play can occur The embodiment of FIG. 3 is very similar to the embodiment of FIG. 2. Analogous parts are designated by the same reference numerals as in FIG. 2 increased by 100. The only difference between the embodiment of FIG. 3 and FIG. 2 lies in the connection between the cover unit 171 and the basic housing tube 131. The basic housing tube 131 is provided with a radially outwardly directed flange 178. The extension 143c of the iron jacket 143 is radially inwardly flanged below the radially outwardly directed flange 178 for providing the connection between the cover unit 171 and the basic housing tube 131. The radially outwardly directed flange 178 is obtained by providing an external circumferential groove 179 into the outer circumferential face of the basic housing tube 131. The inward flanging of the flange 143d is again made by rolling or caulking, while the cover unit 171 is pretensioned against the basic housing tube 131. It is to be noted that during this flanging operation at 143d, the upper end of the basic housing tube 131 is again radially supported at 177 by the iron flange portion 137. It is further to be noted that the radially inner end 157 of the flange 143d is spaced from the base surface 159 of the groove 179 for avoiding any misalignment.

In all other details the construction and the assembling corresponds to the embodiment of FIG. 2.

Figure 4:
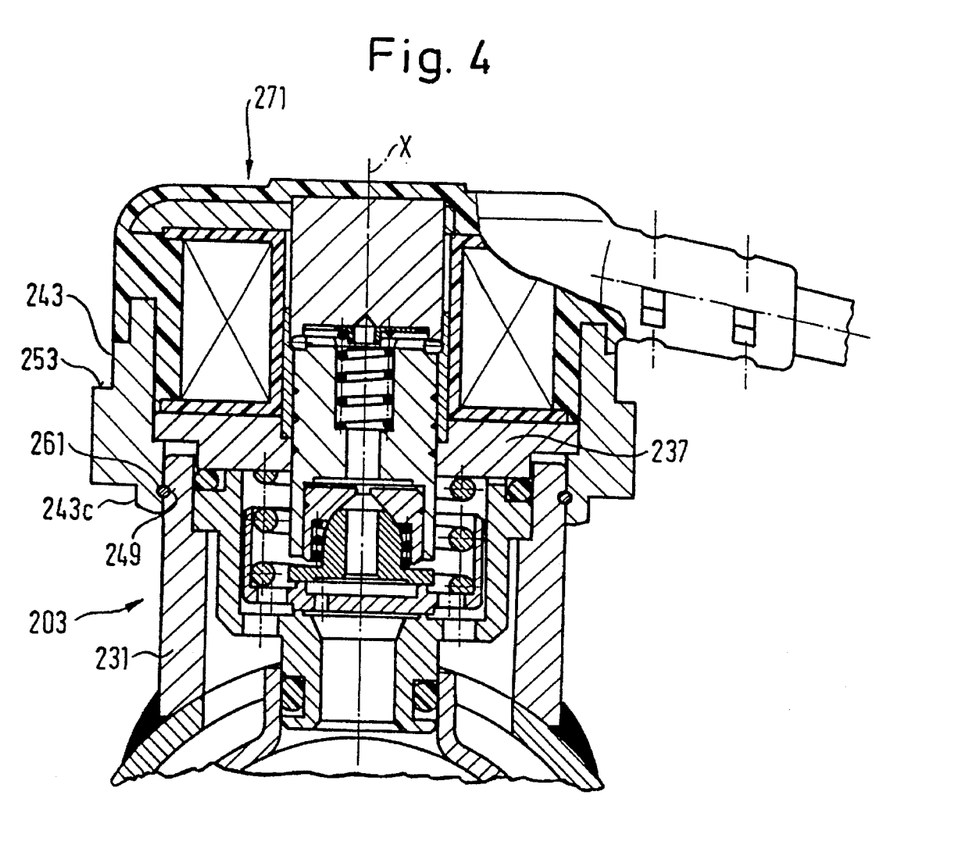
FIG. 4 shows a cross-sectional view as in FIG. 2, with a third embodiment of nonreleasable connection means.

A third embodiment is shown in FIG. 4. This embodiment is again very similar to the embodiment of FIGS. 1 and 2. Analogous parts are designated by the same reference numbers increased by 200. In the embodiment of FIG. 4 the iron jacket 243 is again provided with an extension 243c extending around the basic housing tube 231. A groove 249 is provided in the radially outer face of the basic housing tube 231. A locking ring 261 is inserted into the groove 249. The extension 243c of the iron jacket 243 is rolled or caulked onto the locking ring 261 for nonreleasably connecting the cover unit 241 to the basic housing tube 231. This is again made during maintaining a pretension between the cover unit 271 and the basic housing tube 231. The interengagement of the iron flange portion 237 with the iron jacket 243 again supports the extension 243c during the rolling or caulking operation.

Figure 5:
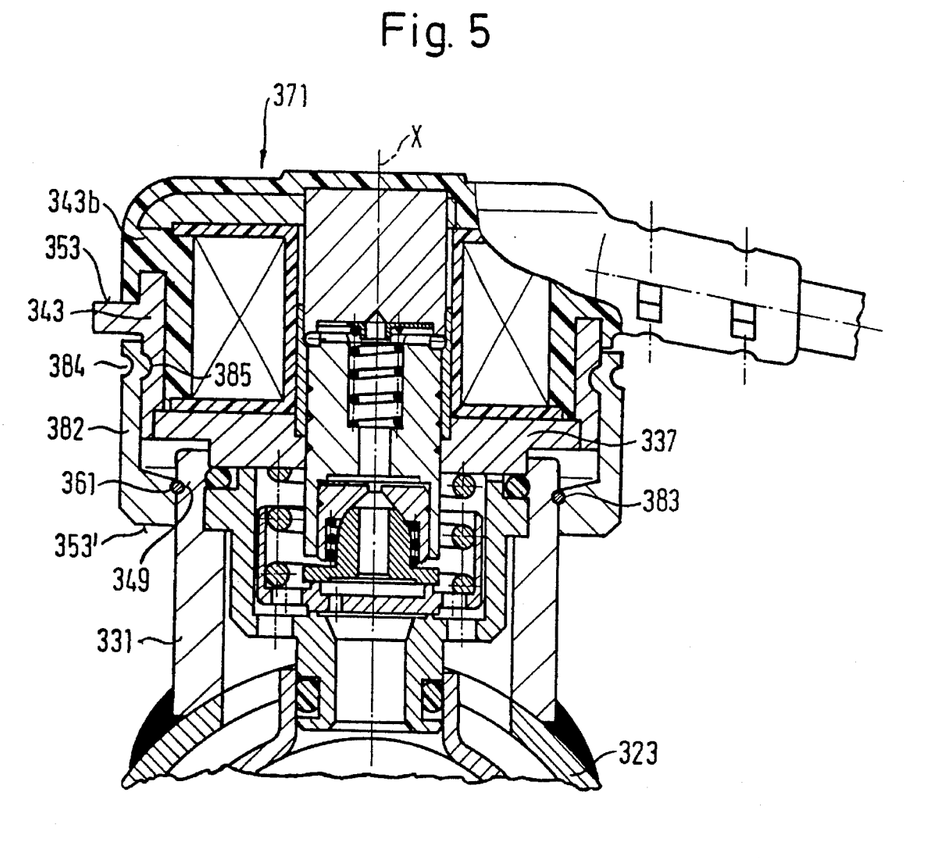
FIG. 5 shows a cross-sectional view as in FIG. 2, with a fourth embodiment of nonreleasable connection means.

In the embodiment of FIG. 5 which is again similar to the embodiment of FIG. 2, analogous parts are designated by the same reference numbers increased by 300. In this embodiment an interconnecting sleeve 382 is provided by connecting the cover unit 371 with the basic housing tube 331. The interconnecting sleeve 382 is axially fixed in upward direction by an abutment ring 361, which is engaged by an upwardly open groove 383 of the interconnecting sleeve 382. The abutment ring 361 is inserted into a groove 349 provided in the external circumferential face of the basic housing tube 331. The interconnecting sleeve 382 overlaps the iron jacket 343. The connection between the interconnecting sleeve 382 and the iron jacket 343 is obtained by shaping a circumferential bead 384 into a groove 385 of the iron jacket 343 while maintaining an axial pretension between the pretension surface 353 and a further pretension surface 353' of the interconnecting sleeve 382. The basic housing tube 331 is free of radial and axial forces during assembling. The iron jacket 343 and the interconnecting sleeve 382 are supported by the iron flange portion 337, when the bead 384 is made by rolling or caulking. One can see in all embodiments that a tight engagement is provided between the ferromagnetic core 44, the iron end wall 43a, the iron jacket 43 and the iron flange portion 37, such as to obtain a closed magnetic circuit around the electromagnetic coil 39. The pole tube may be soldered to the ferromagnetic core 44 and to the iron flange portion 37. A separation of the cover unit 71 from the basic housing tube 31 results in the destroying of the valve unit 3.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

The invention as described hereinabove in the context of the preferred embodiments is not to be taken as limited to all of the provided details thereof, since modifications and variations thereof may be made without departing from the spirit and scope of the invention.

We claim:

1. A fluid operated oscillation damper with an electromagnetically controlled valve unit for varying the damping force of said oscillation damper, said valve unit comprising a plurality of fluidic and electromagnetic valve unit components, at least part of said fluidic and electromagnetic valve unit components being accommodated within a valve unit compartment of said oscillation damper, said valve unit compartment being confined by compartment confining means, said compartment confining means comprising at least two housing units, one of said housing units being a basic housing unit attached to a part of said oscillation damper, a further one of said housing units being a cover unit attached to said basic housing unit, said cover unit being nonreleasably connected by nonreleasable connection means with said basic housing unit; and said cover unit being partially made of metallic material and partially made of plastics material, said nonreleasable connecting means being provided between said basic housing unit and said metallic material of said cover unit.

2. A fluid operated oscillation damper as set forth in claim 1, said cover unit being connected to said basic housing unit by positively interengaging locking means.

3. A fluid operated oscillation damper as set forth in claim 1, said basic housing unit and said cover unit having respective sleeve-shaped portions overlapping each other in an axial direction along a common axis, said sleeve-shaped portions being connected with each other, one of said sleeve-shaped portions being a radially inner sleeve-shaped portion, and the other one of said sleeve-shaped portions being a radially outer sleeve-shaped portion.

4. A fluid operated oscillation damper as set forth in claim 3, said radially inner sleeve-shaped portion being provided with a circumferential groove within a radially outer surface thereof, said radially outer sleeve-shaped portion being provided with a radially inward displaced circumferential bead engaged into said circumferential groove.

5. A fluid operated oscillation damper as set forth in claim 3, said radially inner sleeve-shaped portion being a part of said basic housing unit, said radially outer sleeve-shaped portion being a part of said cover unit.

6. A fluid operated oscillation damper as set forth in claim 1, sealing means being provided between said basic housing unit and said cover unit, said sealing means being maintained under sealing pressure by said nonreleasable connecting means.

7. A fluid operated oscillation damper as set forth in claim 1, said basic housing unit having tubular shape and being fastened by one of its ends to a container tube member of said oscillation damper, the other end of said tubular basic housing unit being connected to said cover unit.

8. A fluid operated oscillation damper as set forth in claim 1, said basic housing unit and said cover unit having a common axis, said cover unit accommodating an annular electromagnetic coil around said axis and an axially movable armature member inside a central space surrounded by said annular electromagnetic coil.

9. A fluid operated oscillation damper as set forth in claim 8, said electromagnetic coil being provided with ferromagnetic core means toroidally extending around said annular electromagnetic coil, said ferromagnetic core means comprising a ferromagnetic flange portion provided axially between said annular electromagnetic coil and said basic housing unit.

10. A fluid operated oscillation damper as set forth in claim 9, said ferromagnetic core means further comprising a ferromagnetic jacket surrounding said annular electromagnetic coil and integral with a ferromagnetic end wall adjacent an end face of said annular electromagnetic coil remote from said ferromagnetic flange portion, said ferromagnetic jacket providing a portion of said cover unit nonreleasably connected to said basic housing unit.

11. A fluid operated oscillation damper as set forth in claim 10, said ferromagnetic end wall having a central opening axially aligned with said central space, a central ferromagnetic core member being located inside said central opening and extending into said central space, said central opening being closed by a plastics material layer of said cover unit, said plastics material layer covering said ferromagnetic end wall and at least part of said ferromagnetic jacket.

12. A fluid operated oscillation damper as set forth in claim 11, said plastics material layer of said cover unit extending through openings of said ferromagnetic jacket and being integral with a plastics material jacket surrounding said annular electromagnetic coil at least on a radially outer circumferential side thereof.

13. A fluid operates oscillation damper as set forth in claim 12, said plastics material jacket forming together with a radially outward open annular coil carrier a coil housing for said annular electromagnetic coil.

14. A fluid operated oscillation damper as set forth in claim 10, said ferromagnetic flange portion being in axial engagement with a substantially axially directed engagement face of said ferromagnetic jacket.

15. A fluid operated oscillation damper as set forth in claim 14, said ferromagnetic flange portion being maintained in axial engagement with said engagement face by said nonreleasable connecting means.

16. A fluid operated oscillation damper as set forth in claim 9, said ferromagnetic flange portion being axially supported by a valve components housing axially supported by and inside said basic housing unit and open toward said central space such as to expose the valve unit components inside said valve components housing to said armature member.

17. A fluid operated oscillation damper as set forth in claim 16, sealing means being provided for sealing said valve components housing with respect to said ferromagnetic flange portion and said basic housing unit.

18. A fluid operated oscillation damper as set forth in claim 1, said cover unit being provided with pretension application means permitting pretensioning of said cover unit toward said basic housing unit during connecting said cover unit to said basic housing unit.

19. A fluid operated oscillation damper with an electromagnetically controlled valve unit for varying the damping force of said oscillation damper, said valve unit comprising a plurality of fluidic and electromagnetic valve unit components, at least part of said fluidic and electromagnetic valve unit components being accommodated within a valve unit compartment of said oscillation damper, said valve unit compartment being confined by compartment confining means, said compartment confining means comprising at least two housing units, one of said housing units being a basic housing unit attached to a part of said oscillation damper, a further one of said housing units being a cover unit attached to said basic housing unit, said cover unit being nonreleasably connected by nonreleasable connection means with said basic housing unit;

said basic housing unit and said cover unit having a common axis, said cover unit accommodating an annular electromagnetic coil around said axis and an axially movable armature member inside a central space surrounded by said annular electromagnetic coil;

said electromagnetic coil being provided with ferromagnetic core means toroidally extending around said annular electromagnetic coil, said ferromagnetic core means comprising a ferromagnetic flange portion provided axially between said annular electromagnetic coil and said basic housing unit; and said ferromagnetic core means further comprising a ferromagnetic jacket surrounding said annular electromagnetic coil and integral with a ferromagnetic end wall adjacent an end face of said annular electromagnetic coil remote from said ferromagnetic flange portion, said ferromagnetic jacket providing a portion of said cover unit nonreleasably connected to said basic housing unit.

20. A fluid operated oscillation damper as set forth in claim 19, said cover unit being connected to said basic housing unit by positively interengaging locking means.

21. A fluid operated oscillation damper as set forth in claim 19, said basic housing unit and said cover unit having respective sleeve-shaped portions overlapping each other in an axial direction along a common axis, said sleeve-shaped portions being connected with each other, one of said sleeve-shaped portions being a radially inner sleeve-shaped portion, and the other one of said sleeve-shaped portions being a radially outer sleeve-shaped portion.

22. A fluid operated oscillation damper as set forth in claim 21, said radially inner sleeve-shaped portion being provided with a circumferential groove within a radially outer surface thereof, said radially outer sleeve-shaped portion being provided with a radially inward displaced circumferential bead engaged into said circumferential groove.

23. A fluid operated oscillation damper as set forth in claim 21, said radially inner sleeve-shaped portion being a part of said basic housing unit, said radially outer sleeve-shaped portion being a part of said cover unit.

24. A fluid operated oscillation damper as set forth in claim 19, sealing means being provided between said basic housing unit and said cover unit, said sealing means being maintained under sealing pressure by said nonreleasable connecting means.

25. A fluid operated oscillation damper as set forth in claim 19, said basic housing unit having tubular shape and being fastened by one of its ends to a container tube member of said oscillation damper, the other end of said tubular basic housing unit being connected to said cover unit.

26. A fluid operated oscillation damper as set forth in claim 19, said cover unit being partially made of metallic material and partially made of plastics material, said nonreleasable connecting means being provided between said basic housing unit and said metallic material of said cover unit.

27. A fluid operated oscillation damper as set forth in claim 19, said ferromagnetic end wall having a central opening axially aligned with said central space, a central ferromagnetic core member being located inside said central opening and extending into said central space, said central opening being closed by a plastics material layer of said cover unit, said plastics material layer covering said ferromagnetic end wall and at least part of said ferromagnetic jacket.

28. A fluid operated oscillation damper as set forth in claim 27, said plastics material layer of said cover unit extending through openings of said ferromagnetic jacket and being integral with a plastics material jacket surrounding said annular electromagnetic coil at least on a radially outer circumferential side thereof.

29. A fluid operates oscillation damper as set forth in claim 28, said plastics material jacket forming together with a radially outward open annular coil carrier a coil housing for said annular electromagnetic coil.

30. A fluid operated oscillation damper as set forth in claim 19, said ferromagnetic flange portion being in axial engagement with a substantially axially directed engagement face of said ferromagnetic jacket.

31. A fluid operated oscillation damper as set forth in claim 30, said ferromagnetic flange portion being maintained in axial engagement with said engagement face by said nonreleasable connecting means.

32. A fluid operated oscillation damper as set forth in claim 19, said ferromagnetic flange portion being axially supported by a valve components housing axially supported by and inside said basic housing unit and open toward said central space such as to expose the valve unit components inside said valve components housing to said armature member.

33. A fluid operated oscillation damper as set forth in claim 32, sealing means being provided for sealing said valve components housing with respect to said ferromagnetic flange portion and said basic housing unit.

34. A fluid operated oscillation damper as set forth in claim 19, said cover unit being provided with pretension application means permitting pretensioning of said cover unit toward said basic housing unit during connecting said cover unit to said basic housing unit.

\* \* \* \* \*

UNITED STATES PATENT AND TRADEMARK OFFICE
CERTIFICATE OF CORRECTION

PATENT NO. : 5,462,142
DATED : October 31, 1995
INVENTOR(S) : Günther HANDKE, Alfred WIRTH, and Andreas ZIETSCH It is certified that error appears in the above-indentified patent and that said Letters Patent is hereby corrected as shown below:

On the title page, item [54], after 'ELECTROMAGNETIC', delete "VALUE" and insert --VALVE--.

In column 1, line 3, in the title, after 'ELECTROMAGNETIC', delete "VALUE" and insert --VALVE--.

In column 9, line 21, after '08/238,806' insert --(still pending)--.

In column 9, line 55, after "jacket" insert --43.--.

In column 10, line 11, after "jacket" insert --43.--.

Signed and Sealed this

Eighteenth Day of February, 1997

Attest:

BRUCE LEHMAN

*Attesting Officer*   *Commissioner of Patents and Trademarks*